United States Patent Office 3,527,398
Patented Sept. 8, 1970

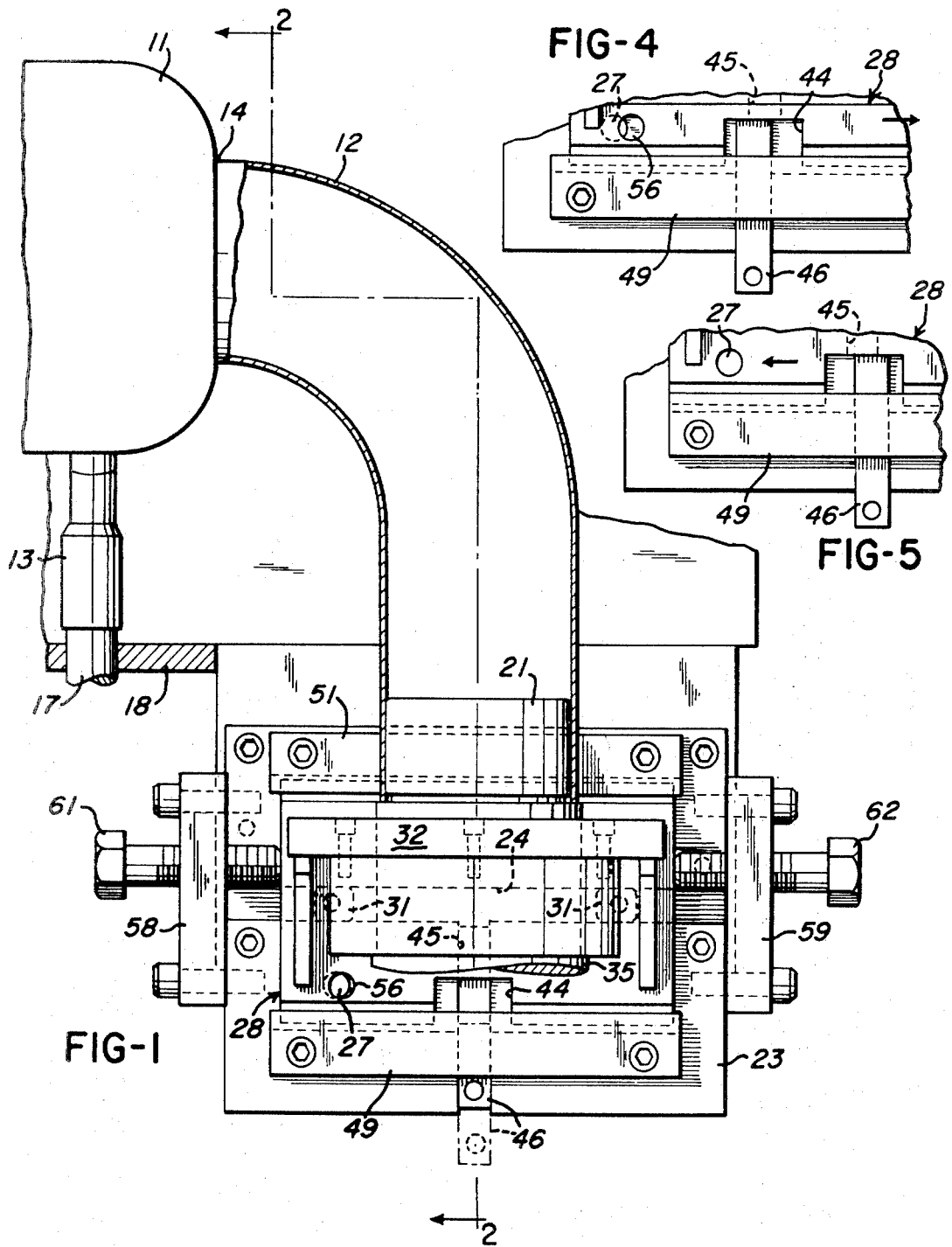

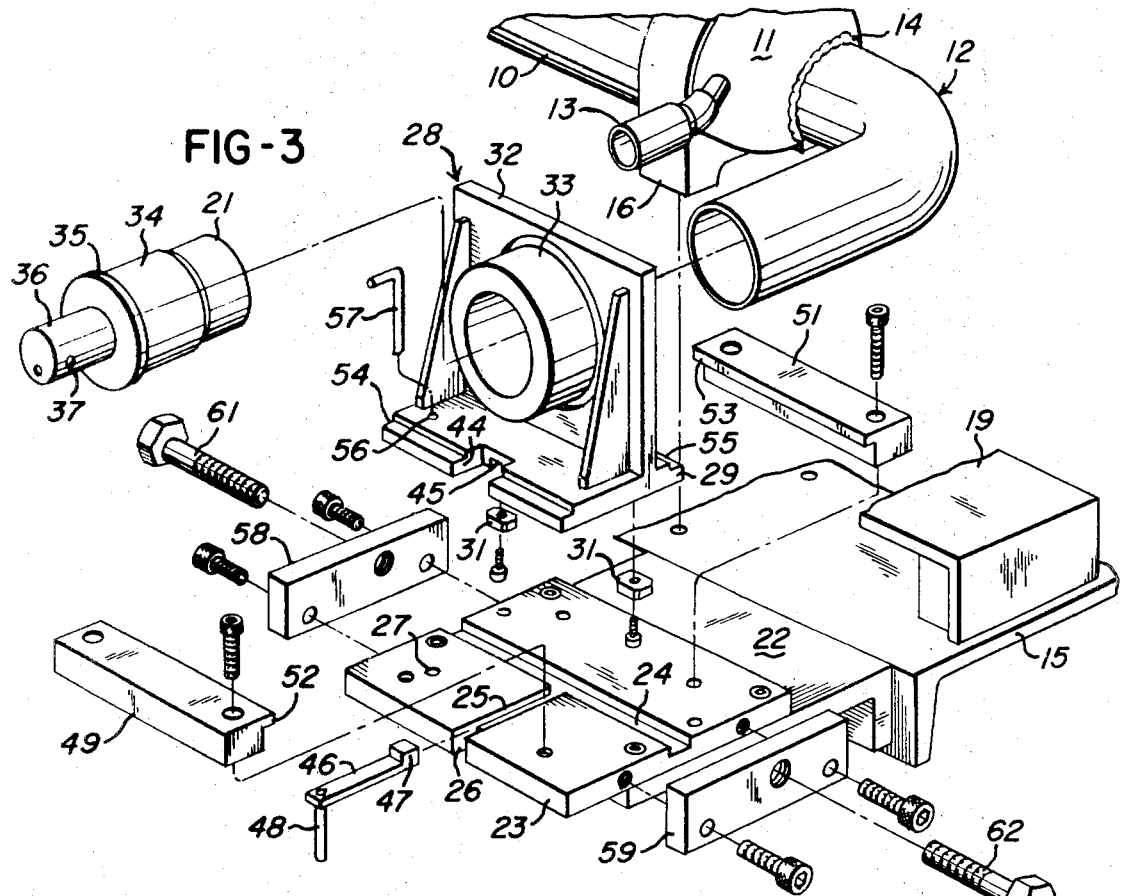
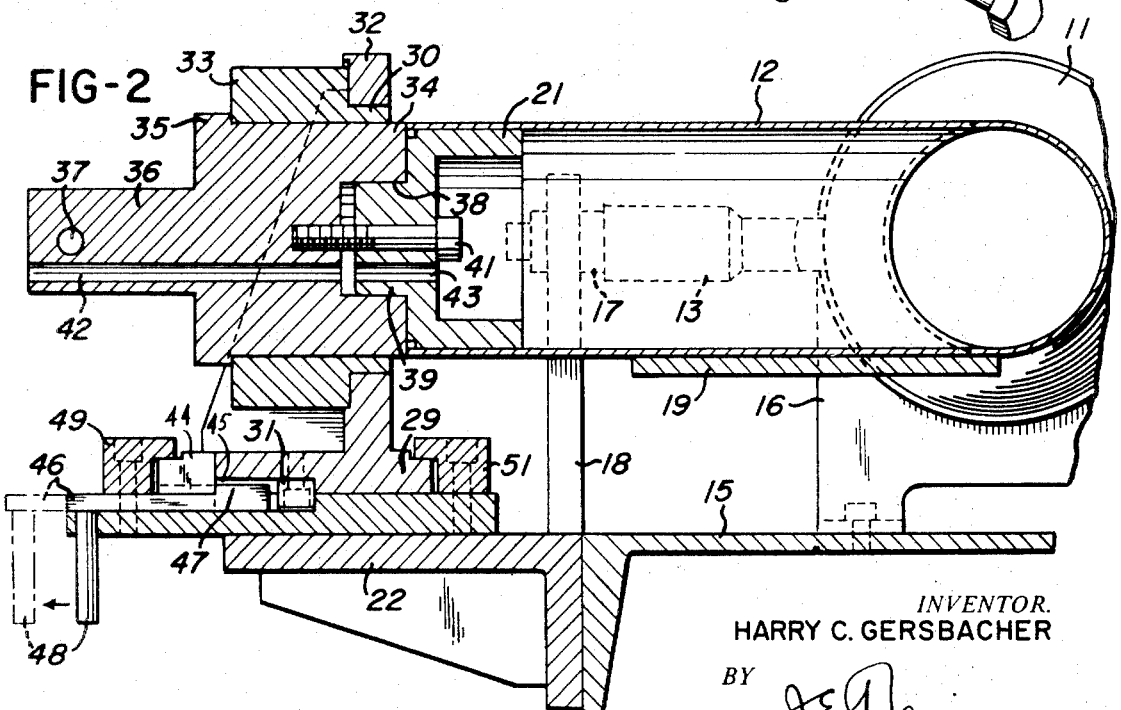

3,527,398
LOW DIMENSIONAL TOLERANCE WELDING
APPARATUS
Harry C. Gersbacher, Dayton, Ohio, assignor to United
Aircraft Products, Inc., Dayton, Ohio, a corporation of
Ohio
Original application Sept. 19, 1966, Ser. No. 580,349, now
Patent No. 3,408,729, dated Nov. 5, 1968. Divided
and this application July 3, 1968, Ser. No. 810,392
Int. Cl. B23k 19/00
U.S. Cl. 228—44                                    6 Claims

ABSTRACT OF THE DISCLOSURE

An apparatus including a base plate secured to a support table, a body member freely slidable in one direction on the base plate, a key attached to the body member movable in a keyway formed in the base plate and a piston cylinder plug member. The parts to be welded are placed on the support table, one securably fixed while the other is attached to the plug member and body member so that during welding the body member can move in only one direction, 90° to the weld joint, the movement caused by the expansion and contraction of the heated parts.

---

This application is a division of Ser. No. 580,349, filed Sept. 19, 1966, now Pat. No. 3,408,729.

This invention relates to fixturing apparatus useful in welding.

An object of the invention is to provide apparatus as described of particular utility in the fabricating of distortionless assemblies of low dimensional tolerance.

In welding, heating and cooling of the welded joint produces stretching and shrinking effects and introduces torsional stresses. As a result it is difficult to achieve the structural precision in the welded article that is sometimes required. The instant invention has particularly in view a generally new welding fixture lending itself to a method of welding obviating the mentioned problems.

Other objects and structural details of the invention will appear from the following description, when read in connection with the accompanying drawings, wherein:

FIG. 1 is a partly diagrammatic top plan view showing a welding fixture in accordance with the illustrated embodiment of the invention in a connected relation to parts to be welded, the fixture being shown in a locked-up position which it assumes in a preparatory step of the welding process;

FIG. 2 is a view in cross section, taken substantially along the irregular line 2—2 of FIG. 1;

FIG. 3 is an exploded view in perspective of the fixture of FIG. 1, showing its relationship to the part to be welded;

FIG. 4 is a fragmentary view of the locking mechanism as shown in FIG. 1, the fixture being shown unlocked with the parts positioned as they appear under applied welding heat; and FIG. 5 is a view like FIG. 4, showing the parts as they appear after the weld has cooled.

Although of general utility, the welding fixture of the invention has particular application to the joining of an elbow extension to a cylindrical tank-like structure as illustrated in FIGS. 1 and 3. As there shown, a cylindrical shell 10 has a manifold 11 at one end thereof to which is attached one end of an elbow member 12, the latter projecting a short distance in the axis of the shell 10 and then turning 90° to place its outer end in an axis perpendicular to the axis of the shell. Projecting laterally from the manifold 11 is a fluid flow fitting 13. The elbow member 12 is welded to the manifold 11 at weld location 14. The practice of the present invention comes into play as a result of requirements for nearly exact parallelism of the axis of the elbow 12 and fitting 13 and a high degree of precision in the dimension between such axis. Welding at the location 14 imparts twisting stresses to the elbow which if uncontrolled may result in a loss of the desired accuracy of construction of the fabricated part.

In preparing the assembly for welding of the elbow 12 to the manifold 14, the shell 10 with its attached manifold 11 and fitting 13 is mounted on a stationary table 15 in cradle means 16. The latter inhibit rocking movements of the shell. A plug 17 (FIG. 1) is closely received in the fitting 13 and is in turn mounted in an upstanding wall 18 on the table 15. As a result the shell 10 and its manifold 11 are fixed against movement relative to the stationary table 15.

The elbow 12 rests on an auxiliary table 19 suitably fixed to the stationary table 15, and has its inner end in mating relation to a center opening in the manifold 11. The elbow 12 is freely slidable on the auxiliary table 19 in an extending and retracting direction relative to the manifold 11. It is controlled in its movements, however, by a plug 21 received with a close fit in its outer end, the plug 21 being part of a welding fixture mounted on a front extension 22 of the table 15. Further comprised in such fixture is a base plate 23 bolted or otherwise secured to the top surface of table 22. In the top surface of plate 23 is a transverse through keyway 24. Also in the top surface of plate 23 is a slot-like recess 25 extending longitudinally of the plate 23 and terminating at the front end thereof in a cut-out portion 26 extending through the plate 23 from the top to bottom thereof. Still further in the plate 23, to one side of the slot 25 is a drilled hole 27 serving a guaging function to be later described.

In a superimposed position on the base plate 23, and supported thereby, is a body member 28. Such body portion comprises a rectangular base portion 29 on the bottom of which are longitudinally spaced keys 31 received in the keyway 24. Upstanding from the base portion 29 is a vertical wall 32 to the front of which is bolted a bearing bushing 33 having a central pilot portion 30 projecting into a through opening in wall 32. Closely received in the bushing 33 for longitudinal sliding motion therein is a cylindrical piston-like member 34. A flange 35 on the member 34 is adapted to engage the front of bushing 33 to limit inward longitudinal motion of the member 34. Projecting beyond such flange 35 is a reduced diameter stem-like extension 36 of piston member 34. A cross bore 37 in the reduced diameter stem 36 is adapted to receive a rod whereby the piston member 34 may more readily be shifted by hand longitudinally within the bushing 33. The end of the member 34 opposite stem portion 36 may be considered the inner end and projects through and beyond the inner end of bushing 33 through wall 32. The central recess 38 therein receives a reduced diameter projecting portion 39 of the aforementioned plug 21. The latter limits against the inner end of piston member 34 and is so held by a bolt 41 passed through the reduced diameter projecting portion 39 and having a threaded engagement in member 34 at the bottom of recess 38. The plug 21 is smaller in diameter than the piston member 34, by an amount approximately equal to the wall thickness of the elbow 12. With the plug 21 received in the elbow the outer end of the latter abuts and limits against the end of member 34. In the member 34, and plug 21, are through bores 42 and 43 venting the interior of elbow 12, tending to maintain ambient pressure in the elbow despite heating and cooling thereof.

At what may be considered its front edge the base portion 29 of the body member 28 is formed with a cut-out 44 extending longitudinally from the rear wall of such cut-out, on the underside of base portion 29, is a short length slot 45. A latch member 46 is slidably mounted in the slot-like recess 25 in base plate 23. The inner end thereof, which includes a lamination 47 is adapted to enter slot 45 with a relatively close fit. The outer end of the latch 46 projects beyond the front end of base plate 23 and has a dependent finger piece 48 by which the latch may be slid longitudinally in the slot-like recess 25. In response to this movement the laminated inner end of the latch is alternately projected into and withdrawn from the slot 45. Within the slot the latch precludes lateral movement of the body member 28. Withdrawn from such slot, the inner end of the latch lies in cut-out 44 and permits lateral motion of the body member within limits as defined by the length of such cut-out portion.

The body member 28 is confined by engagement of its key 31 in the keyway 24 to movement in a sense longitudinally of keyway 24 and laterally of the plate 23. The plate 23 is so fixed to the table 22 as to place this motion in a plane parallel to the axis of the shell 10 and at right angles to the axis of the outer end of elbow 12. Motion of the body member 28 in any other sense is prevented. Assisting in confining and guiding the body member 28 is a pair of hold-down plates 49 and 51 made fast on the base plate 23 respectively to the front of and to the rear of body member 28. The hold-down members have longitudinally extending projecting lips 52 and 53 respectively overlying and engaging in respective slideways 54 and 55 on the front and rear respectively of the member 28.

The base portion 29 of the body member 28 has a drilled hole 56 adapted to traverse or to move across the underlying drilled hole 27 in base plate 23. When the holes 56 and 27 are aligned a guage pin 57 can be inserted to be received in both holes. When the position of body member 28 is such as to misalign the holes 56 and 27 the gauge pin 57 cannot be so inserted.

Suitably attached to opposite side edges of the base plate 23 are end blocks 58 and 59. In block 58 is installed a screw 61, a similar screw 62 being installed in block 59. The screws 61 and 62 have a threaded engagement in the respective blocks and project therethrough to have their inner ends abut respective side edges of the base portion 29 of body member 28. The blocks 38 and 59 accordingly serve as reactant members whereby the screws 61 and 62 may correspondingly be adjusted to effect incremental movements of the body member 28 in the keyway 24.

In carrying out the welding method of the invention the piston member 34 is manually retracted while the elbow 12 is placed on the table section 19 in a manner to position its one end cooperatively with the body member 28 of the welding fixture and to position its other end cooperatively with the manifold 11. The body member is locked relatively to the base plate 23 and stationary table 22 by advancing the latch 46 inward to place the laminated end 47 thereof in the slot 42. Elbow 12 is adjusted to align its one end with the bushing 33 whereupon the piston member 34 is advanced in the bushing to cause its plug 21 to enter the elbow. The described one end of the elbow 12 accordingly is thus fixed relatively to the body member 28, its location at this time conforming to an initial position as compared to operating positions it may assume during welding and to a final position it assumes after cooling. The final position of the elbow is that position which it is required to take to maintain the specified tolerance between the axes of the elbow and of the fitting 13.

While the body member 28 remains locked to the base plate 23, the end of elbow 12 cooperatively engaged with the manifold 11 is temporarily fixed thereto as by tack welding at several locations around the circumference of the elbow. When this has been done the body member 28 is unlocked from the base plate 23 by withdrawing the latch 46 from engagement in slot 45. The body member is now free to move lengthwise of the keyway 24, within limits defined by the cut-out 44, although being confined, as noted, against motion in any other sense. The weld at location 14 now is effected, any conventional method being used, as by depositing weld metal around such locations in an arc welding process. The heat generated by welding has an expanding effect on the elbow 12 which, if uncontrolled, would introduce components of twisting and extending motion to the elbow with no assurance that cooling would have an inverse directly compensatory effect. In accordance with the instant invention, however, the outer end of the elbow is connected to the body member 28 and so is prevented from moving in any sense other than that permitted such body member. Accordingly, the expansion effect created by the heat of welding is resolved into an elongation of the elbow in the axis of the shell 10, the body member 28 moving in keyway 24 to permit such elongation. The parts at a maximum condition of elongation may assume the relative positions illustrated in FIG. 4 wherein the slot 45 is shown to have moved out of alignment with latch 46 to the right as there viewed. The elbow 12 accordingly has moved from its initial position to a relatively extended position. When the welding is complete, the parts are allowed to cool. This motion which again is capable of distorting the elbow 12 is in accordance with the instant invention controlled by the body member 28 and resolved into a retracting motion in the sense of the permitted travel of the body member 28. The latter retracts or moves leftward in the keyway 24, in accordance with characteristics of welding operation the retracting movement being to and beyond the described initial position of the elbow whereby to place the slot 45 out of alignment with latch 46 in a position leftward of initial position as shown in FIG. 5. According to the predetermined positioning and relationship of the parts, the position to which body member 28 retracts under the cooling movement of elbow 12 defines the final required position of the elbow. This may be verified by the gauge openings 56 and 27. These holes, which were slightly misaligned when the body member 26 was locked in initial position became further misaligned under the application of welding heat to assume relative positions substantially as shown in FIG. 4. During retracting brought about by cooling of the elbow, the holes 56 and 27 returned to the slightly misaligned position at which the operation began and under the continued further retraction to final position assume an aligned relation. Alignment may be checked by insertion of the guage 57 as previously described. Should the guage pin 57 find some degree of misalignment of the holes 56 and 57 still to be present the screws 61 and 62 are adjusted in order manually to move the body member 28 and stress the elbow. The motion introduced by the screws 61 and 62 is such as to overstress the elbow which in returning partly from such overstressed condition is repositioned to the desired extent. The elbow 12 is released from the welding fixture by retracting the piston member 34 within bushing 33.

It will be understood that parts which are shown separable herein may if desired be made integral, and vice versa. For example, the plug 21 is shown bolted to the piston member 34 in order that it may be replaced by another, like element, smaller in diameter or greater or lesser in length. It could, however, be made integral with the piston member if desired. Other modifications and changes in the welding apparatus and method of welding as disclosed are of course possible within the concepts of invention as here illustrated and described.

What is claimed is:

1. Apparatus for welding one part to another where the dimensional tolerances of the resulting assembly are low, including a table supporting said parts, one thereof being supported in a substantially fixed position and the other being supported for freedom of extending motion under the heat of welding and for freedom of retracting motion as the weld cools, a base plate made fast to said table, a body member freely slidable on said base plate in a sense corresponding to said extending and retracting motions and restrained from motion in other senses, said body member being a part of a welding fixture, means on said body member engageable with said other part to confine its movements during and after welding to movements allowed said body member, and releasable means for locking said body member in said fixture in a position locating said other part in an initial position slightly extended from the final position it is to occupy upon completion of the weld, the temporary fixing of said other part to said one part followed by unlocking of said body member and effecting of the weld resulting in extending and retracting motions of said other part accommodated by sliding motion of said body member, said body member preventing torsional movements of said other part.

2. Apparatus according to claim 1, characterized in that said locking means comprises a latch slidable in said base plate and engageable in said body member to lock said body member against motion in said one sense, said latch being retractable to unlock said body member for motion as described.

3. Apparatus according to claim 1, characterized by gauge means on said base plate and on said body member aligned by travel of said body member under movement of said other part to final position.

4. Apparatus according to claim 1, characterized by means for moving said body member in said one sense to stress said other part after welding in the event of undertravel or overtravel thereof in moving to final position.

5. Apparatus according to claim 1, wherein said other part is an elbow adapted to be welded at its one end to said part and wherein plug means on said body member interfits with the other end of said elbow, characterized in that said locking means includes a latch slidable on said plate and extendable and retractable into locking engagement with said body member, said body member having a recess capable of receiving said latch only in initial position, gauge means on said base plate and on said body member misaligned in initial position aligned by travel of said body member under movement of said elbow to final position, and means mounted on said base plate manipulative to move said body member in said one sense after welding to stress said elbow in the event of undertravel or overtravel to final position.

6. Apparatus according to claim 1, wherein said locking means comprises a latch carried on one of the pair of elements comprised by said base plate and said body member, said latch being positionable in a recess in the other one of said pair of elements and retractable therefrom, entry of the latch into said recess being possible only when said body member is positioned to locate said other part in said initial position.

References Cited

UNITED STATES PATENTS

| | | | |
|---|---|---|---|
| 3,239,039 | 3/1966 | Kucka | 228—49 X |
| 3,238,346 | 3/1966 | Savko | 285—21 X |
| 3,092,058 | 6/1963 | Feeler | 29—493 X |
| 3,408,729 | 10/1968 | Gersbacher | 228—44 X |

JOHN F. CAMPBELL, Primary Examiner

R. J. CRAIG, Assistant Examiner

U.S. Cl. X.R.

29—493; 228—49; 285—21